Patented Nov. 26, 1935

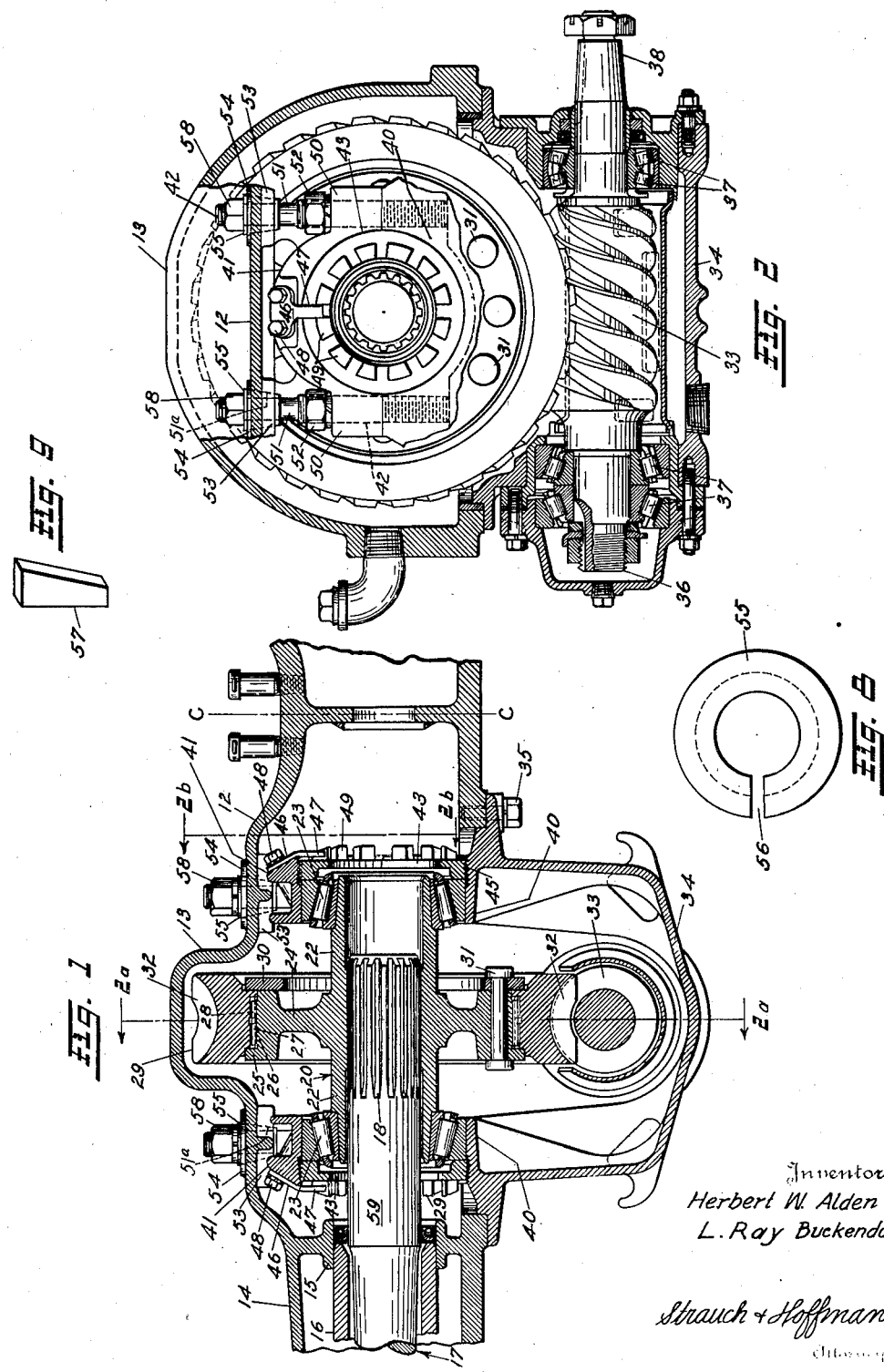

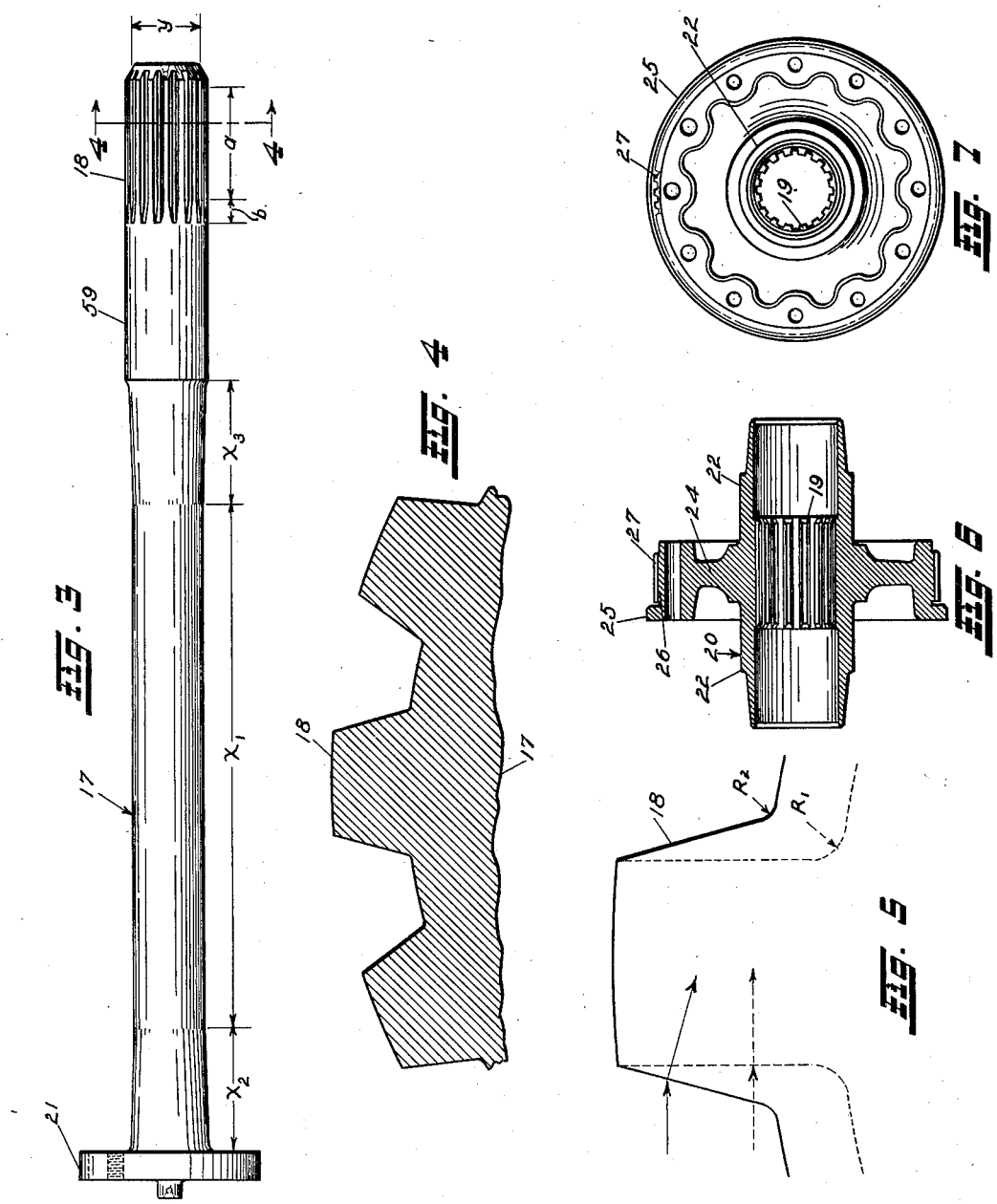

2,022,581

UNITED STATES PATENT OFFICE 2,022,581

DRIVE AXLE

Herbert W. Alden and Lawrence Ray Buckendale, Detroit, Mich., assignors to The Timken-Detroit Axle Company, Detroit, Mich., a corporation of Ohio Application February 16, 1934, Serial No. 711,601

11 Claims. (Cl. 64—1)

This invention relates to driving mechanism for vehicle wheels.

The present invention is especially concerned with an improved driving shaft construction, particularly such as is adapted for use in a rear driving axle assemblage in automotive road vehicles, street cars, rail cars, and the like, wherein an axle shaft has a splined connection, associated with a female member, for transmitting driving torque to a wheel.

In the operation of driving axle shafts of this nature, the axle shafts are subjected to severe torsional stresses and the spline formations thereof are subjected to heavy tangential shearing forces, with the result, that under certain conditions of use, failure may occur in either the axle shaft itself or in its splines.

Driving shafts as proposed prior to this invention have been to a large extent commercially unsatisfactory for certain uses due to the fact that in designing shafts for the transmission of a given or predetermined torque through an internally splined member of restricted size, the shafts have been made of substantially uniform cross-section throughout their length. In such shafts, the overall diameter of the male splined portion adapted to intermesh with the complemental splines of the female members is obviously limited by the restrictions placed on the latter; and prior shafts have had their strength calculations based substantially on the overall diameter of the shaft splines, and hence have been made of uniform or approximately uniform size throughout their lengths in the attempt to provide a shaft of maximum strength.

Such constructions necessarily result in the splined portion of the shaft being weaker or more susceptible to failure than the main body section thereof since the strength of the splined shaft portion or, for that matter, the strength of the shaft itself is dependent primarily on the root diameter of the shaft splines. Therefore, in all such constructions there have been frequent occurrence of failures in the shaft at its spline formation. Some of such failures have occurred in the splines themselves in the confined spline portion, i. e., in that portion of the axle shaft's splines actively engaged and confined by the complemental splines of the female member, due to the heavy tangential shearing forces set up on the splines during operation of the driving axle shaft. Most of such failures have occurred in the unconfined spline portion, i. e., in that portion of the splined section which is unconfined by the splines of the female member, due to twisting of the unconfined splined portion beyond its elastic limit, since this unconfined portion of the shaft is very short compared with the unsplined or body section of the shaft and hence entirely inadequate, even were it free to do so, for the torsional elasticity of the metal in the unconfined spline portion to assert itself.

Practically all failures could be eliminated by enlarging the conventional shafts to give them sufficient predetermined load capacity, but as is obvious from the above discussion this would necessitate the use of an undesirably large female splined member. In addition, it would increase the weight and cost of the shaft itself. Such increases are avoided by the present invention in a manner about to be fully explained.

One of the primary objects of the present invention is to provide an axle shaft having a reduced body section of appreciable length, which permits "winding up" of the shaft, due to the elasticity of the metal, before failure will occur and thus save the spline section from failure and at the same time render it almost impossible for the reduced section itself to fail in a properly designed job.

Another object of the invention is to provide an axle shaft which will withstand severe torsional stresses and shocks, having a reduced body section of uniform cross-section and of appreciable length, and having a smooth and even surface so as to prevent localized concentration of torsional stresses and consequent breakage of the shaft.

Another object of the invention is to provide an axle shaft having a reduced body section of uniform cross-section and of appreciable length but having relatively short tapered sections adjacent opposite ends thereof which have smooth contours at the ends of the reduced section, so as to prevent localized concentration of torsional stresses and consequent breakage of the shaft.

Another object of the invention is to provide an axle shaft having a reduced body section of approximately equal or slightly less diameter than that of the root diameter of the shaft splines so as to provide for maximum "wind up" and torsional flexibility and thereby obviate any localized points of torsional stress as occur in shafts where the body diameter is equal to or slightly less than the outside diameter of the splines.

Another object of the invention is to provide an axle shaft having a spline formation of such construction that the driving forces tending to shear the splines during operation of the shaft are applied in such manner as result in the driving forces being directed toward the root circle of the splines thereby lessening the tendency to shear the splines.

Another object of the invention is to provide an axle shaft having splines adapted to complementally interlock with a female splined driving mechanism where the female splined part has a predetermined maximum permissible spline diameter; wherein the spline formation of the axle shaft is of such construction as makes it possible to increase the root diameter of the axle splines without increasing the size of the female spline part to thereby render it feasible to reduce the shaft body diameter for the purpose of affording greater torsional flexibility to, and permitting "wind up" of the shaft, but without, however, producing such a large reduction in size of the axle body as to render the latter susceptible to failure.

A further object of the invention is to provide an axle shaft having splines adapted to complementally interlock with a female splined driving mechanism where the female splined part has a predetermined maximum permissible spline diameter; wherein the spline formation of the axle shaft is of such construction as makes it possible to increase the root diameter of the axle splines without increasing the size of the female spline part, to thereby render it feasible to reduce the shaft body diameter for the purpose of affording greater torsional flexibility to, and permitting "wind up" of the shaft; and wherein the spline connection of the shaft and driving sleeve is of such construction that the tangential forces normally tending to shear the splines is resolved into a resultant component which lessens the tendency to shear the splines; to thereby obtain a shaft construction of maximum strength and one which is not readily susceptible to failure either in the body section proper or in the splined section.

These and other objects will appear from the specification, when considered in connection with the accompanying drawings, wherein:

Figure 1 is a vertical longitudinal section through one bowl of a worm drive vehicle axle construction of the double bowl type, embodying the invention;

Figure 2 is a vertical transverse section taken chiefly on line 2a—2a and partially on line 2b—2b in Figure 1;

Figure 3 is a view in elevation of the improved driving shaft embodied in Figures 1 and 2;

Figure 4 is a greatly enlarged fragmentary sectional view taken on line 4—4 of Figure 3;

Figure 5 is a special illustrative view comparing one of my improved axle shaft splines (full lines) with the type of splines heretofore used (broken lines);

Figure 6 is a vertical longitudinal section taken centrally through the driving sleeve shown in Figure 1;

Figure 7 is a right end view in elevation of the driving sleeve shown in Figure 6;

Figure 8 is a top plan view of one of the tapered split dowels embodied in Figures 1 and 2; and Figure 9 is a view in perspective of a cork member which is used in conjunction with the split dowel shown in Figure 8.

With further reference to the drawings wherein like reference characters designate like parts throughout the several views, the invention is shown in connection with a worm drive vehicle axle construction of the double bowl type. The center line C—C represents the longitudinal vertical center line of the double bowl axle and to the left thereof is shown one half of the axle assembly, and it will be understood that the construction is exactly duplicated on the right of the center line C—C. The reference character 12 designates the axle housing which has an expanded or irregular bowl shaped portion 13 defining an internal annular chamber, and a tubular portion 14. The tubular portion 14 is provided interiorly thereof with a flange having an enlarged end 15 which serves as a support for one end of a sleeve 16 adapted to receive one of the driving shaft sections 17. The inner end of the driving shaft 17 is provided with splines 18 which are intermeshed with similar splines 19 provided in the inner periphery of the driving sleeve 20. The outer end of the shaft 17 is adapted to be connected to the hub of one of the driven wheels, in conventional manner, for example, as shown in Figure 3, by means of the upset flange 21.

The driving sleeve 20 has axially aligned hub portions 22 which are journalled in suitable bearings 23 provided therefor in members to be described later, and has a radially extending central portion 24 which is provided with a circumferential flange 25 and a recessed annular shoulder 26. The annular shoulder 26 is provided with external splines 27 which are complementally interlocked with similar splines 28, provided at the inner periphery of a gear ring 29. The gear ring 29 is thus mounted on the driving sleeve 20 and the driving sleeve and gear ring are confined within the annular chamber defined by the bowl 13, being preferably mounted through an opening provided in the bottom of the bowl 13. An annular ring 30 is cooperatively associated with the circumferential flange 25 to prevent relatively axial movement between the driving sleeve 20 and the gear ring 29, being rigidly secured to the driving sleeve 20, by through rivets 31 or the like.

The gear ring 29 is provided with worm teeth 32 at the outer periphery thereof which intermesh with a worm gear 33 therebelow. A gear carrier 34 is removably secured to the bottom of the bowl portion 13 of the axle housing by bolts 35. The gear carrier has a worm propeller shaft 36 which extends transversely of the axle shaft section 17 and is journalled in suitable bearings 37 provided therefor in said carrier. The worm propeller shaft 36 has the worm gear 33 formed thereon and the forward end 38 of the shaft extends or projects beyond the carrier and is adapted to be connected in the usual manner to a source of driving power (not shown).

The gear carrier 34 has a pair of yoke or carrier members projecting up into the annular chamber defined by the bowl portion 13 of the axle housing, each yoke comprising a yoke section 40 integral with the carrier, and a substantially semi-cylindrical complemental member 41 rigidly secured to the yoke section 40 by special studs 42 and associated members yet to be described. The yokes receive the bearings 23 in which the hub portions 22 of the driving sleeve 20 are journalled. The gear carrier thus supports the driving sleeve 20 and the driving member 29 therefor, with the gear carrier removably secured to the axle housing as above described and covering the opening in the bowl shaped portion of the housing.

An externally threaded conventional retainer ring 43, is adapted to be screwed into the internal threads 45 provided in the yoke members to maintain the bearings 23 in proper position. A plate member 46 having a depending arm 47 is secured to each of the yoke sections 41 as by cap screws 48. The depending arm 47 is cooperatively associated with laterally projecting lugs 49 formed on the retainer rings 43 to prevent rotation of the rings.

The yoke or carrier members 41 are provided with lugs 50 through which extend the studs 42, the lower ends of which are stud-threaded and locked in the complemental yoke portions 40. Yokes 41 are clamped to yoke portions 40 by means of nuts 52 which surround screw-threaded central portions of the studs 42 and which are suitably prevented from loosening by any well known means. The upper portion 51 of each stud is of smaller diameter than the lower portion. Said upper portion 51 projects through a tapered opening 51a in the top of the bowl-shaped portion 13 of the axle housing. The smallest diameter of the opening 51a is greater than the outside diameter of said upper stud portion. Said tapered openings 51a are surrounded by strengthening bosses 53 and 54 respectively below and above the housing upper wall. A conically tapered dowel 55, split as at 56 to receive a cork member 57 (see Figures 8 and 9), is inserted in the said stud receiving opening and surrounds the upper end 51 of the stud. A nut and washer assembly 58 is secured to the end 51 above the dowel 55. The advantages of this arrangement will be later explained.

On assembling the device, the gear ring 29 is mounted on the annular shoulder 26 of the central portion of the driving sleeve 20, the splines 28 of the gear ring being piloted into the splines 27 of the recessed shoulder 26. The annular ring 30 is then secured to the driving sleeve by the rivets 31. The axially aligned hub portions 22 are journalled in the bearings 23 mounted in the yoke sections 40, after which the complemental yoke sections 41 are secured to the respective yoke sections 40. The gear carrier 34 and assembled mechanism is inserted in the opening provided in the bottom of the bowl shaped portion, with the yoke members projecting into the axle housing to extend the studs 51 upwardly through the tapered openings 51a provided in the axle housing as described. The split tapered dowels 55 are then assembled and drawn up on the studs 51 by means of nuts 58 thereby attaining self-alignment.

It will be understood that with this improved mounting of the yoke stud portions 51, the enlarged and tapered stud receiving openings 51a provided in the axle housing do not require extremely accurate spacing or boring, and assembly is facilitated by the fact that since the holes have clearance over the studs, the studs do not have to be in exact alignment with said openings. Furthermore, since each of the tapered dowels is longitudinally split, the dowels are radially flexible so that when assembled on the ends 51 of the studs they can be forced into firm surface contact with the enlarged housing openings, and at the same time be contracted so that they will grip the outer periphery of the studs so as to prevent lateral movement of the studs with respect to the walls of the housing openings. In other words, if there is any misalignment, the tapered dowels act as wedges which bring the studs into alignment with the housing holes and insure a rigid connection which in turn insures that there will be little or no weave or deflection in the differential mounting. Any distortion or stress due to such aligning action is taken by the studs, the yokes and the housing. Therefore no excessive initial strains are set up in the studs.

If the holes 51a were made to the same size as the studs, it would be impossible to assemble the studs into the housing for the reason that any manufacturing errors would bring the holes or the studs off center and out of alignment. In order to correct this condition, it has been proposed to simply make the holes over-size, but this gives a non-rigid assembly and is little better than the older conventional carrier design where the studs are not elongated to extend through the housing, but stop at the bearing cap bosses.

The cork members 57 are inserted in the openings 56 of the dowels to prevent oil leaks and it will be understood that in clamping the dowels on the studs, the cork will be compressed, thereby further reducing the possibility of oil leaks.

With reference particularly to Figure 3 of the drawings, there is shown in detail a preferred embodiment of the improved driving axle shaft generally denoted at 17. The shaft comprises an end 59 on which are formed the splines 18 having a portion designated at $a$ normally confined by the splines of the female driving member during operation of the device, and an unconfined portion designated at $b$; an upset flange 21; and a body consisting of a relatively long reduced main body section $x_1$, and relatively short tapered sections $x_2$ and $x_3$ adjacent the upset flange 21 and the end portion 59 respectively. The diameter of the reduced section $x_1$ preferably is made approximately equal to the root diameter $y$ of the splines 18, but in any event the maximum permissible diameter should not exceed the root diameter $y$ of the splines plus approximately one third of the spline depth. As shown, the diameter of the reduced section is slightly less than the root diameter of the splines. In such construction the weakest section per unit of length of the shaft is the body of the shaft but it will be noted that this section is relatively long and permits "winding up" of the shaft so that the torsional elasticity of the metal of the body section may fully assert itself and thereby tend to prevent failure.

The reduced body section $x_1$ is of uniform cross-section throughout its length and has a smooth and even surface which prevents the localization or concentration of torsional stresses, and consequent breakage of the shaft.

The axle shaft 17 is preferably made by forging to provide a shaft of suitable length and diameter, the connecting flange 21 and the end 59 being formed by an upsetting operation. In carrying out the latter process, the stock is heated at each end and clamped in a die adjacent the end and the upsetting operation performed. Inasmuch as the metal in the clamping die is raised to a relatively high temperature, it is oxidized on its surface and scale is formed. If the entire body were made of uniform section, when the scale was removed, the portions adjacent the upset ends would be of a less diameter than the center portion of the shaft. These scaled sections would extend for a length of several inches adjacent the upset ends and hence the construction would not be entirely satisfactory in that quick changes of section in a shaft in torsion renders it susceptible to localized concentration of torsional stresses and consequential possible failure or breakage of the shaft. To obviate having these weakened sections in the production of the axle shaft, according to the present invention, sufficient metal is incorporated near the ends so that when the scale is removed, the sections adjacent the upset flange 21 and the upset portion 59 will be of the required diameter. To this end the relatively short tapered body sections $x_2$ and $x_3$ are provided as shown, adjacent the upset flange 21 and the upset portion 59 respectively. These tapered sections do not have an exact predetermined length but preferably extend axially inwardly of the shaft slightly beyond the clamping dies disposed at the respective ends thereof for the performance of the upsetting operation as described so that oxidation of the shaft will occur for the most part adjacent the inner edge of the clamping die. Therefore, the oxide may vary in thickness without causing the shaft diameter at any point to be less than that of the reduced body section, and any irregularities in the scaled product may be finished off in any suitable manner to provide a smooth and even surface, with the tapered surfaces nicely merged into that surface which is of uniform cross section.

It will be further noted that the tapered sections $x_2$ and $x_3$ also merge into the reduced body section $x_1$, and have smooth and even contours at the ends of the reduced body section and thus the structure is not open to the objection of possible localized concentration of stresses and consequent possible breakage of the shaft.

The splines 18 provided on the shaft are relatively fine and shallow and of slant-sided formation, the significance of which is important. In driving shafts of the present nature, wherein the shafts are designed to transmit a predetermined or given maximum torque through an internally splined female part of restricted size, the size of the male splined section of the axle shaft obviously is limited by the maximum permissible internal diameter of the female splined part.

In Figure 5 of the drawings there is shown a special illustration of the improved slant-sided spline (full lines) as compared to a conventional spline (dotted lines), it being understood of course that the latter is transposed with respect to the former. As illustrated, the conventional male spline has parallel sides and hence may be aptly called a straight-sided spline. The cutting of male splines is in general accomplished by means of a hob since this method is preferable from a production standpoint. The necessary load-bearing or lateral surface of the spline side is first determined from the load which is to be applied and the outside diameter obtainable, i. e., the maximum or given torque to be transmitted by the shaft through its splined connection with the female member, which has a predetermined maximum permissible diameter limiting the size of the male member. The fillet as at $R_1$ is then calculated. Thus the size of the root diameter is determined or fixed and it is this root diameter upon which depends the strength of the shaft. The splines are then cut on the male member by a hob, the fillets as at $R_1$ being formed by the hob cutter during the generation of the splines. It will be obvious in this connection that the larger the diameter of the splines, the deeper the flutes become, i. e., with proportionate increase in shaft diameter to sustain increased given torque, depth of splines is correspondingly increased so as to provide necessary bearing surface. The deeper the flutes the larger becomes the fillets for the hob cutter has less room in which to work. Hence in any given set of conditions where the conventional male spline is utilized, in order to increase the shaft strength it is necessary to increase the root diameter by decreasing the depth of the splines. However, this practice has been found to be objectionable since it decreases the necessary bearing surface and permits frequent failure in the splines themselves.

The problem is solved by the present invention, as the use of slant-sided splines results in a spline having the necessary load-bearing surface calculated as above but in which the size of the fillet as at $R_2$ is considerably reduced with a corresponding increase in the size of the root diameter, without however, correspondingly increasing the size or root diameter of the female member. The fillet as at $R_2$ is reduced by the fact that the spline is shallower and also the angle of the corner into which the hob cutter extends in its generation of the spline is materially increased thereby affording greater freedom of movement to the hob cutter in its generation of the spline which is in contradistinction to the restricted or hampered functioning of the hob cutter in its generation of the straight-sided splines above described. The shaft strength is further increased by increasing the number of splines on the male member, over and above the number as heretofore used, since this permits still shallower splines to be used for the same amount of total bearing surface with the resultant decrease in fillet. By using a multiplicity of slant-sided splines, approximately sixteen in number, it has been found that shaft strength can be increased by at least thirty-three percent for the same outside diameter of spline.

When the male splines 18 of the shaft are intermeshed with the complemental splines 19 of the female member, the construction is such as to provide a very close or snug fit of the male splines within the female splines all around the periphery of the shaft so that the root of the male splines is maintained as close as possible to the inside diameter of the female splines.

With further reference to the special illustration of the improved slant-sided spline (full lines) as compared to a conventional spline (dotted lines) as shown in Figure 5, and with particular reference to the latter, it will be noted that the tangential driving force, designated by the dotted arrow, is applied in such manner that there is a tangential shearing force normally tending to shear off the straight-sided splines; whereas in the improved spline, the tangential driving force designated by the full line arrow, is resolved into a resultant that is perpendicular to the slant side of the spline and hence are directed substantially toward the bases or root circle of the splines. Therefore, there is less tendency to shear the splines and a more stable construction is realized.

From the foregoing, it will be understood that the construction is such that there is small possibility of occurrence of failure in the driving shaft in either its splined portion as at $a$, normally confined by the complemental splines of the female member during operation of the device, or in the unconfined splined portion as at $b$, or in the reduced body section of the shaft. The multiplicity of fine shallow splines (preferably slant-sided) which fit snugly in the female member provides a superior construction of maximum strength, and in which there is small likelihood of failure in the confined spline portion at $a$. The improved spline formation, by making it possible to increase the root diameter of the male splines, without correspondingly increasing the size of the female splines, renders it possible to reduce the shaft body diameter for the purpose of permitting "winding up" or providing maximum torsional flexibility in the shaft body so that there is small likelihood of failure in the unconfined spline portion at b, or for that matter, in the body portion proper since the above advantages are realized without, however, forming such a large reduction in size of the shaft body (when reducing the latter for greater wind-up) as to render the latter readily susceptible to failure.

As above indicated the shaft is so designed as to be balanced throughout, that is, to have all parts thereof of substantially the same strength and failure-resistance under both normal driving conditions and under the application of shock loads. Likewise it is desirable that the strength of the female member be balanced with that of the male member and to this end the bases of the flutes of the male member where they join the shaft are made of the same width as the corresponding base portions of the flutes of the female member. As a result of this construction, in order to obtain a snug interfit between the male and female members, the flutes of the male member are materially wider along the pitch line than are the grooves of the male member along said pitch line. This is of real advantage because it very materially increases the amount of metal in the "runout" or unconfined splined portion b of the shaft (Figure 3) which portion, as aforestated, is most susceptible to failure. The runout portion b thus being strengthened by the wider splines or flutes, it becomes actually stronger than would be a cylindrical shaft of a diameter substantially equal to the spline root diameter. Hence, by this single discovered expedient, the male and female members are matched as to strength and simultaneously the axle shaft becomes balanced throughout for successful transmission of high torque, all without any increase in the required restricted size of the female member.

With reference to the preceding paragraph and to Figure 4, the groove between each pair of splines not only has an average width less than the spline width but also has a total depth very materially less than said average width, the bottom of the groove being cylindrically curved with a radius about equal to that of the reduced body section of the shaft. The importance of spline shallowness in the disclosed arrangement of parts has already been explained.

By the arrangement described, the driving torque is transmitted to the axle shaft 17 through the driving sleeve 20 having associated therewith the worm ring 29 to thereby provide an individual drive for each of the driven rear wheels. It will be understood that the invention is not limited to an axle of the double bowl type employing an individual drive for each of the driven wheels, but may be employed in conjunction with a conventional differential mechanism wherein a differential mechanism would be substituted in lieu of the driving sleeve 20. In this alternative form, the differential unit and associated driving member therefor would normally be mounted substantially midway of the rear driving axle.

Obviously, the invention is not limited to driving axles with worm drive gearing and it will be understood that preferred embodiments only of the invention have been disclosed and many modifications thereof may be made by those skilled in the art without departing from the spirit of the invention. Accordingly what is desired to be secured by Letters Patent of the United States and claimed as new is:

1. A drive shaft having a portion provided with a multiplicity of shallow splines for connecting the shaft to a driving member, said shaft having a relatively long reduced body section of a diameter approximately equal to the root diameter of said shallow splines, the groove between each pair of splines having an average width less than the spline width and also having a total depth very materially less than said average width; whereby said splined portion is of great strength for its overall diameter and said long body section, though reduced, is of sufficiently large diameter to handle the load that the strengthened spline portion can take.

2. In the construction as defined in claim 1, said reduced body section having a maximum diameter not exceeding the root diameter of the shaft splines plus approximately one third of the spline depth.

3. An axle shaft designed to transmit a predetermined or given maximum torque through an internally splined female member of restricted internal size, said shaft consisting of a splined portion of overall diameter that is limited by said restricted female member and that has an unusually shallow spline depth, and an elongated body portion formed integral with and smoothly joined to said splined portion, said elongated body portion being of a decreased diameter approximately equal to the root diameter of said splined portion, thus to provide sufficient torsional flexibility to prevent failure of said splined portion which would otherwise result from the limitation in size as required by said female member, while simultaneously maintaining said elongated body portion sufficiently large to avoid failure therein.

4. A shaft designed to transmit a predetermined or given maximum torque through an internally splined female member of restricted size, said shaft having a splined section of overall diameter that is limited by said restricted female member, said splined section comprising a portion adapted to be normally confined by the complemental splines of said female member and a runout portion which is unconfined by the latter, said shaft splines being of flat and slant-sided formation whereby the tangential driving force which is directed against the respective splines confined by the complemental splines of the female member, during operation of the shaft is resolved into a resultant that is approximately perpendicular to the flat slanting sides of said splines so as to lessen possibility of failure thereof; said shaft having an elongated body section formed integral with and smoothly joined to said splined section; said elongated body section being of a diameter approximately equal to the root diameter of said splined section to provide torsional flexibility thereby preventing failure in the unconfined spline portion of said shaft splined section which would otherwise result from the limitation in size as required by said female member while simultaneously retaining sufficient capacity in said elongated body section to handle said maximum torque.

5. A shaft having a portion designed to be coupled with a surrounding female member of relatively small size for transmission of high torque, and an integral elongated portion of slightly less diameter than said coupling portion, and a multiplicity of splines formed on said coupling portion, said splines being fine, uniformly spaced and of such shallow depth that their root circle is of substantially the same diameter as that of said elongated shaft portion to give said coupling portion a torsional strength substantially equal to that of said elongated portion.

6. In the construction defined in claim 5, said splines having flat slanting sides; and the bottom of each groove that is formed by the opposing faces of a pair of splines, being joined to said faces by minute fillets.

7. In a drive shaft the combination of a relatively long reduced body section of uniform cross section and a splined section for coupling said reduced section to a complemental member to form a driving connection, said splined section comprising a multiplicity of relatively shallow slant-sided splines the root circle of which is of substantially the same diameter as that of said reduced body section.

8. In a drive shaft, the combination of a relatively long body section of uniform cross-section and a but slightly larger spline section for coupling said body section to a complemental member to form a driving connection, said splined section comprising approximately sixteen relatively shallow slant-sided splines, forming an equal number of grooves, the bottoms of which extend inwardly approximately to the projected surface of said long body section.

9. A drive shaft having a splined portion for connecting the shaft to a driving member; said shaft having a relatively long body section of just such minimum diameter as is sufficient to provide the maximum safe wind-up for torsional flexibility, said long body section having relatively short tapered sections adjacent opposite ends thereof; and said shaft splined portion comprising a multiplicity of slant sided splines, said splines being of such shallow depth that the root diameter of said spline portion is approximately equal to the average diameter of said body section.

10. A balanced power shaft designed to transmit a predetermined or given maximum torque through an internally splined female member of restricted internal diameter, said shaft having a splined section of overall diameter that is limited by the restricted internal size of the female member, and an elongated body section formed integral with said splined section, said body section including a portion that is circumferentially reduced relative to the splined section to permit said body section to wind up to give protection against shock load but sufficiently large to withstand said given maximum torque, said splined section comprising a multiplicity of identical uniformly spaced slant-sided flutes separated by a corresponding number of grooves, said grooves being of a shallow depth approximately equal to the reduction of said portion of the body section, the bases of the flutes being substantially equal in width to the open ends of the grooves, and the average or mean widths of the flutes being materially greater than the average or mean widths of the grooves, whereby the flutes will handle the maximum torque that is withstood by said elongated body section.

11. A balanced power shaft designed to transmit a predetermined or given maximum torque through an internally splined female member of restricted internal diameter, said shaft having a cylindrical end of overall diameter that is limited by the restricted internal size of the female member, and an elongated body section formed integral with said cylindrical end but of a diameter sufficiently less than said overall diameter to permit said body section to wind up to give protection against shock load while sufficiently large to withstand said given maximum torque, said cylindrical end comprising a splined section consisting of a fully splined portion designed to be confined by the female member and a run-out portion designed to be unconfined, said splined section comprising a multiplicity of identical uniformly spaced slant-sided flutes separated by a corresponding number of shallow grooves, the bottoms of said grooves being cylindrically curved with respect to the shaft axis and the radius of their curvature being substantially equal to the radius of said elongated body section, the bases of the flutes being substantially equal in width to the open ends of the grooves, and the average or mean widths of the flutes being materially greater than the average or mean widths of the grooves; whereby a minimum amount of material is removed from said run-out portion of the cylindrical end during the spline-forming operation, as a result of which both the fully splined portion and the run-out portion will handle the maximum torque that is withstood by said elongated body section, and the run-out portion will withstand shock loads under the protection of the wind-up action of the elongated body portion.

HERBERT W. ALDEN.
L. RAY BUCKENDALE.